United States Patent [19]

Davis

[11] 4,078,829

[45] Mar. 14, 1978

[54] METAL RACING SULKY

[76] Inventor: Jesse B. Davis, 196 S. Kilburn Rd., Garden City, L.I., N.Y. 11530

[21] Appl. No.: 728,609

[22] Filed: Oct. 1, 1976

[51] Int. Cl.² .................... B62C 1/08; B62D 27/04
[52] U.S. Cl. .................................. 280/657; 280/63
[58] Field of Search ............... 280/63, 64, 656, 659, 280/657

[56] References Cited

U.S. PATENT DOCUMENTS

| | | | |
|---|---|---|---|
| 507,839 | 10/1893 | Payne | 280/63 |
| 3,628,806 | 12/1971 | Weber | 280/63 |
| 3,847,408 | 11/1974 | King | 280/63 |
| 3,907,325 | 9/1975 | Gaines et al. | 280/657 |

Primary Examiner—Robert R. Song

[57] ABSTRACT

A racing sulky adapted to be drawn by a horse between laterally adjustable guide shafts, said sulky having rider support means including a transverse bar which journals the sulky wheels. A stabilizing bar engages the respective wheel axles, and is longitudinally adjustable to individually regulate wheel alignment.

11 Claims, 6 Drawing Figures

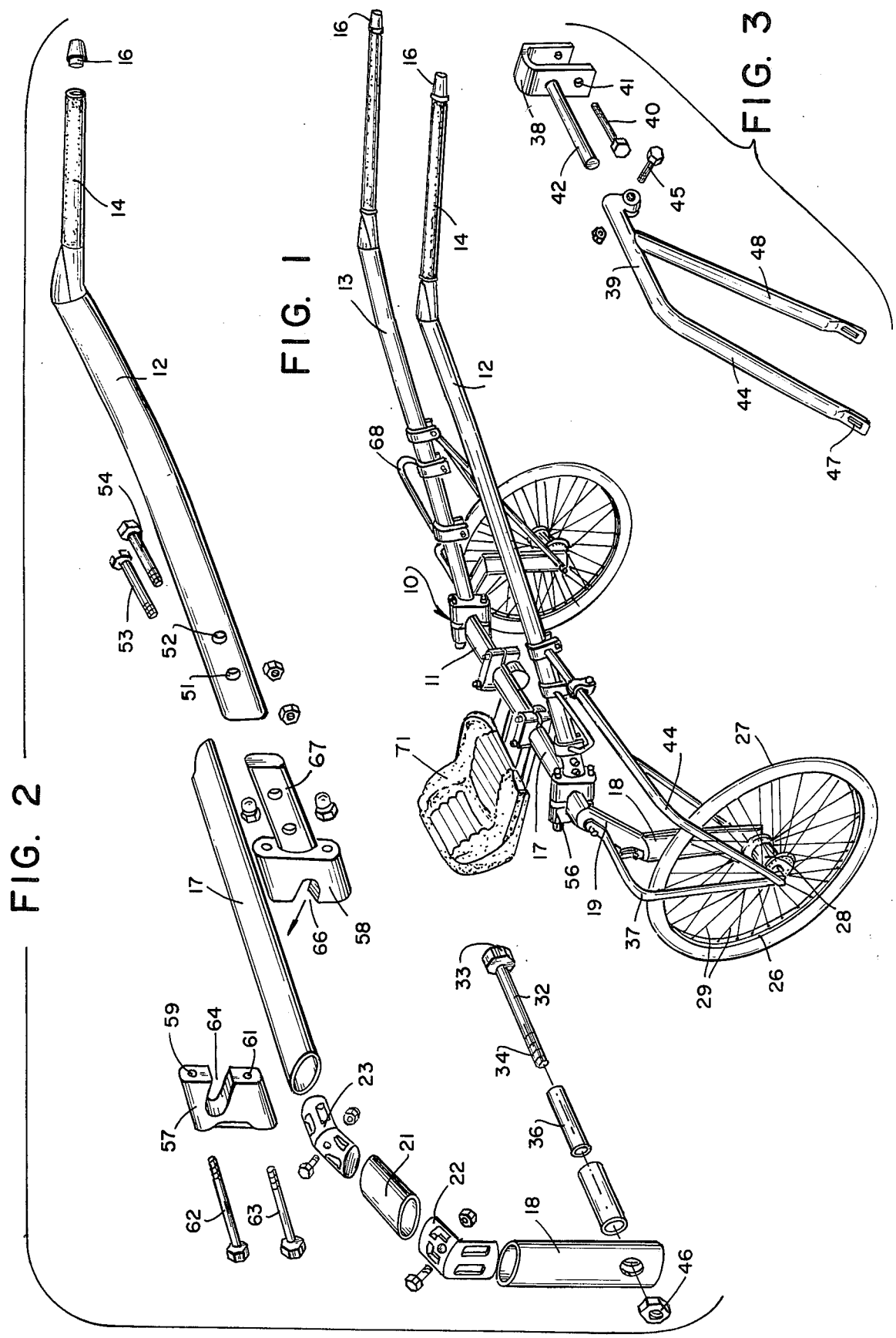

METAL RACING SULKY

BACKGROUND OF THE INVENTION

In harness racing, normally the animal, either a pacer or a trotter, draws a light, two-wheeled sulky having a pair of guide shafts between which the horse is positioned. The sulky is so constructed to support the driver immediately to the rear of the animal. The driver thus holds the reins and both guides and controls the animal by suitable manipulation of the latter.

In the normal sulky it is advantageous to make the chassis as light as possible, yet sufficiently strong to safely carry the driver. Further, the span between the respective wheels is such that the latter are well outboard of the animal to afford stability particularly while on a curved section of a track.

Usually the sulky comprises in essence a wooden chassis bent or formed in a manner to provide the two forward reaching guide shafts which position the horse. The wheels are made as light as possible being spoked and preferably fitted with thin tires to provide most effective operation and the least amount of friction.

Overall, relatively light construction of the sulky characterizes every facet of the vehicle. Consequently, wheel mounting is such that the weight of the driver and the normal vibration and shocks which occur during a race, cause the wheels to deflect and be twisted out of true alignment. This distortion, even though it might be minimal, has the adverse effect of adjusting the wheel camber and consequently of adding a drag factor which slows the horse's speed.

Further, it is appreciated that not all racing horses are built in the same proportions or even running movements. It is desirable therefore that the sulky be so constructed to be as compatible as possible with the size and disposition of the animal. Since the flexibility factor normally means added weight to the sulky, the advantage of lightness is quite often negated to a large part through the addition of inbuilt adjustments, resulting in less efficiency to the unit.

In the arrangement presently disclosed, there is provided a sulky adapted to fasten a horse between a pair of adjacent guide shafts by a harness or similar tackle. Further, the respective guide shafts are positioned substantially parallel and mounted to a common transverse bar which allows the shaft interspacing to be adjusted.

A pair of wheels are journalled to the sulky chassis in a manner to be both relatively rigid while operating, and yet adjustable whereby to best accommodate a particular driver. Further, the wheels are braced to permit their camber to be varied thereby to assure maximum running efficiency and a minimum degree of drag under racing conditions.

It is therefore an object of the invention to provide a light, yet efficient racing sulky adapted to be harnessed to a race horse. A further object is to provide a sulky which is sufficiently versatile to be adjusted in a manner to most conveniently accommodate both a particular horse as well as a driver. A still further object is to provide a sulky adapted to be selectively adjusted whereby to minimize drag which quite frequently results due to misalignment of the sulky wheels either prior to or during a race.

DESCRIPTION OF THE DRAWINGS

FIG. 1 is a three dimensional elevation view of the present sulky.

FIG. 2 is an exploded view of the device of FIG. 1.

FIG. 3 is similar to FIG. 2, showing one portion of the latter.

FIG. 1 illustrates a sulky 10 of the type contemplated which includes a wheeled, driver supporting chassis or carriage 11 having a pair of forward extending guide shafts 12 and 13 which position a horse therebetween. The respective guide shafts 12 and 13 include an elongated brace member having an inner end. Said brace member is primarily straight for the most part along a segment nearest to chassis 11. However, each of the two shafts is normally curved slightly into the space therebetween in order to adapt to a particular horse.

Figure 4:
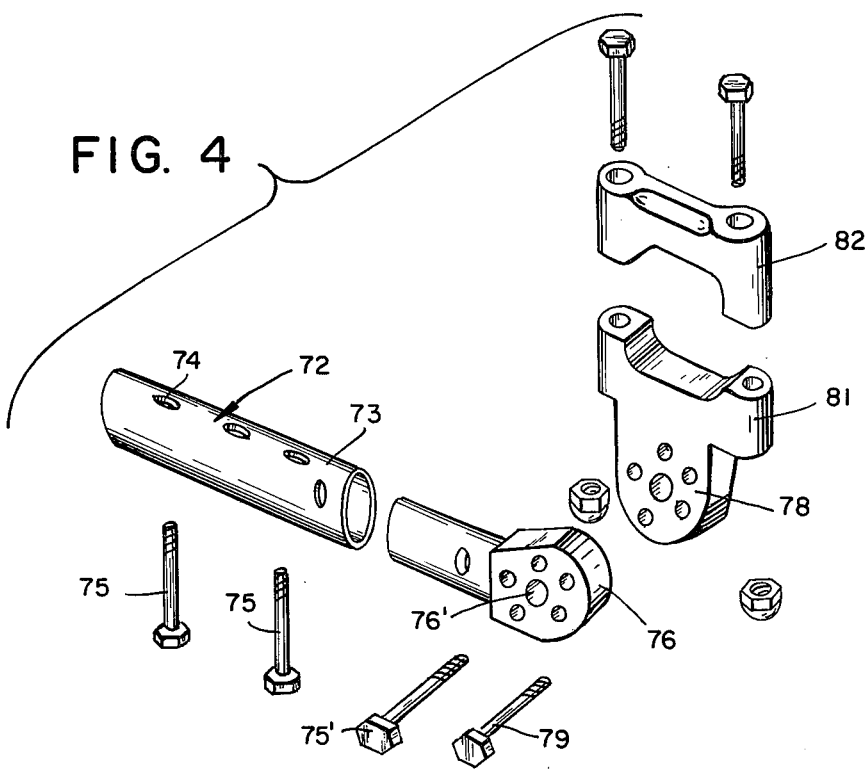
FIG. 4 is similar to FIG. 3.

Each shaft such as 12, is provided with a shaft extension 14 which terminates at a forward cap 16. Functionally, the spaced apart shafts 12 and 13 not only serve to guide the pulling horse; they also engage the horse through a suitable harness or a similar restraining equipment. The respective shaft inner ends are laterally adjustable prior to being fastened into place in operating position, as will be hereinafter noted in greater detail.

The main frame of chassis 11 comprises at least one, and preferably a single transverse elongated bar or beam 17. Said bar 17 is disposed adjacent to the respective shaft inner ends, being aligned substantially normal thereto. Structurally, the at least one transverse bar 17 comprises a metallic tubular member preferably fabricated of a light metal such as aluminum. Such construction assures the dual advantages of maximum strength along with lightness. Preferably, the single transverse bar 17 assumes a nonround configuration or cross sectional area in a plane normal to the bar's longitudinal axis. A configuration of this character can preferably be oval as presently shown; however, it can also be square, rectangular, I-shaped, or any of a number of commercial shapes.

Each remote end of elongated transverse bar 17 is provided with a downwardly extending wheel column 18. Said column 18 is rigidly connected at the bar end by an intermediate strut 19. The latter comprises a tubular sleeve 21 arranged preferably to form a diagonal angle of approximately 45° between the respective bar 17 and column 18. Thus, the possibility of structural stress concentration at the chassis corners and columns is substantially obviated.

Internal support members 22 and 23 are firmly disposed within the ends of sleeve 21. Said support members 22 and 23 are normally formed of cast aluminum and rigidly retained within the respective bar 17 and column 18 ends to supplement and supply needed strength across the bar end, which is subject at times to severe jolting and vibrational stresses.

The lower end of the column 18 is provided with a suitable mounting means to rotatably journal a wheel 26. The latter, to afford maximum utility, is built as light as possible including a relatively narrow, tire supporting peripheral rim 27 which is connected to wheel hub 28 by outwardly radiating spokes 29.

Hub 28 comprises a suitably journalled member such as bushings or bearings 36 adapted to be rotated in position on a shaft at the column 18 lower end. The latter includes a main sleeve or support member 31 disposed transversely of column 18 and firmly affixed thereto. To assure efficient operation the support or sleeves 31 of the respective columns, are initially disposed in axial alignment and parallel to the transverse bar 17. Thus, the respective wheels 26 will be in proper alignment with respect to the sulky and horse.

A stub shaft or axle 32 is registered within support member 31 having a head 33 at the column 18 inner side, and a thread 34 formed on the outer end thereof. A central journal surface between the head and thread ends is adapted to register with wheel bearing 36 to support and journal the latter as wheel 26 rotates.

A degree of vertical support is provided to wheel 26 by an outboard wheel strut 37. The latter is fastened at one end to intermediate sleeve 21 having an elongated arm which overreaches the wheel and engages the threaded end 34 of the shaft 32. To permit a degree of adjustment in the shaft connection, strut 37 end is provided with a slotted opening adapted to slidably engage the shaft 32 prior to being positioned in place with a nut or similar fastener.

A nerf bracer or lateral stabilizing mechanism is attached to a wheel axle 32 and to the guide shaft 12 adjacent thereto. Said bracer mechanism, when properly adjusted and set, controls the wheel 26 disposition particularly with respect to the camber as well as to misalignment which might otherwise occur due to the stress and strain imposed on the sulky during a race. The nerf bracer mechanism is preferably fabricated of tubular metallic construction, having an extendable section 38 which releasably fastens to a forked arm 39. Extendable section 38 includes as one embodiment, an open ended clamp fitting which can assume a generally "U" configuration adapted to slidably register about the periphery of guide shaft 12. The clamp opening is such that the unit can be longitudinally adjusted along shaft 12 ancillary to the sulky preliminary tune-up or fitting procedure.

The clamp member 38 further includes a pair of axially aligned openings 41 adapted to receive a tightening bolt 40 therethrough. In the pulled up, or fastened position, clamp 38 tightly grips guide shaft 12 to position pin 42 laterally from guide shaft 12. Said pin 42 is adapted to slidably engage the socket end of forked arm 39. A tightening collet 43 carried on said arm 39 permits the arm and pin 42 to be rigidly engaged by a bolt 45 during the wheel alignment.

Figure 5:
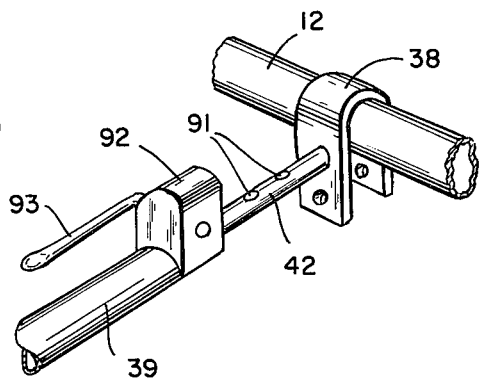
FIG. 5 is an alternate embodiment of the shown locking mechanism.

An alternate arrangement for achieving a rapid and positive locking arrangement is illustrated in FIG. 5. As shown, pin 42 is provided along its upper side with a series of notches 91. Mating arm 39 includes a protruding boss 92 which rotatably retains a locking lever 93. Rotation of said lever 93 functions to either release or firmly lock the telescoping member as required.

Referring again to FIG. 3, forked arm 39 includes a first segment 44 which overreaches wheel 26 and is fastened outboard thereof at shaft 32 by a fastening nut 46. A slotted connection 47 at the end of said first segment slidably registers about the axle 32 to permit a degree of adjustment for achieving the desired wheel alignment.

A second segment 48 of said arm similarly reaches inwardly of wheel 26 and engages axle 32 to be fastened between the axle head 33, and the wheel hub 28. Thus, the entire wheel 26 can be urged as desired into alignment by manipulation of the telescoping fit between the arm 39 and pin 44. Further, when properly adjusted, wheel 26 will be stabilized even when subjected to the stresses and strains characteristic of racing conditions, whereby to maintain the wheels' proper alignment.

As noted, the respective guide shafts 12 and 13 are laterally adjustable to define an infinitely variable spacing therebetween as governed by the width of bar 17. Thus, each shaft, 12 for example, is provided with a terminal socket arrangement such as an axial opening, together with a pair of transverse fastening bolt holes 51 and 52.

Guide shaft 12 inner or socket end is fastened into engagement with a universal connector member 56. The latter, in one embodiment includes at least two locking elements 57 and 58, having cooperating bore holes 59 and 61 therethrough to receive a pair of tightening bolts 62 and 63. Oppositely aligned and shaped jaws formed in each of the respective locking elements 57 and 58, serve to firmly grip the periphery of transverse bar 17 when the fastening bolts 62 and 63 are tightened into place. Preferably the shaped jaws are formed as shown to correspond in shape to the outer contour of transverse bar 17. Further, the respective jaws are so aligned that when slid or guided to a desired position on transverse bar 17, engaging tang 67 will be at a proper elevation to align guide shaft 12 at the correct angle and height to receive the horse.

For assembly purposes the inner end of shaft 12 slidably engages protruding tang 67 into alignment with the respective fastening holes 51 and 52. Thereafter, insertion and fastening of the connecting bolts 53 and 54 will firmly position the guide shafts 12 and 13 with respect to universal connector 56.

Referring to FIGS. 1 and 4, driver's seat 71 depends rearwardly from chassis 11 in a manner to be adjustable in accordance with the driver's need to be comfortable and to better balance the sulky with his feet supported in stirrup 68. A seat support means is thereby provided of tubular construction having at least one, and preferably two outwardly extending arms 72 which depend rearwardly from the transverse rod 17. Said arms 72 comprise primarily an elongated rail 73 having a plurality of openings 74 extending in a vertical direction. Said holes are positioned to receive corresponding fastening holes on a seat 71, which is placed upon the respective rails in a manner to be adjustable in a forward or after position and then firmly fixed by tie bolts 75.

Rail 73 fastens to a clamping member by means of a rotatably adjustable joint. The latter comprises a first plate 76 which depends from the inner end of rail 73, and includes a center transverse hole 76' which is surrounded by circularly arranged, evenly spaced adjusting holes 77. Bolt 75' registering within center hole 76' when tightened, engages plate 76 with a mating plate 78. The latter includes a set of circularly arranged holes 80 which, upon rotation about the fastening bolt 75, register with the evenly spaced holes 77 in first plate 76.

By rotating the respective plates 76 and 78, a desired angle of elevation between the rail bar 73 and the clamping member 81 and 82 can be obtained. The tightening of bolt 75' and insertion of a locking bolt 79 will thereby firmly fix the disposition of the seat member 71.

The seat 71 and said holder 72 as noted can comprise at least one and preferably two arms. These members are slidably adjustable along transverse bar 17 by virtue of a releasable clamping arrangement. Thus, said clamping arrangement includes corresponding depressions formed in the respective mating parts 81 and 82, adapted to firmly engage and be fastened to the transverse bar 17 at such time as a desired lateral seating position has been determined. Operationally, the entire sulky can be disconnected into individual parts and units, a feature that is particularly useful in the matter of shipping or transferring of the chassis between race sites.

For tuning-up or fitting a chassis to a particular horse or driver the oppositely positioned stabilizing braces comprising elements 38 and 39, are disconnected from their respective guide shafts 12. This is achieved by loosening the "U" clamp as well as loosening the telescoping adjustment between the forked member 39 and the column 44 to permit relative movement therebetween.

Thereafter, the respective shafts or stub axles 12 and 13 are loosed and adjusted with respect to each other, and with respect to the transverse bar 17 by sliding the end clamps 57 and 58 as needed. This can include a centering of the respective clamps, or disposition thereof to one side of the chassis or the other whereby to provide an offset line of pull with respect to the horse.

Figure 6:
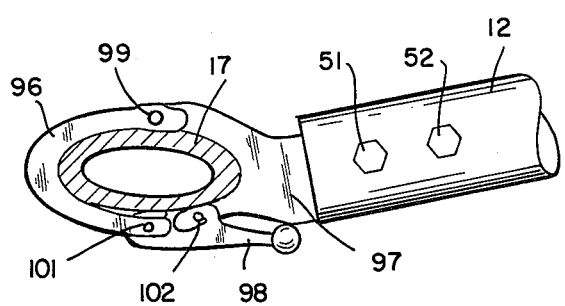
FIG. 6 illustrates an alternate embodiment of the clamping mechanism of FIG. 2.

While the herein described shaft clamping arrangement can be readily manipulated for shaft adjustment, said function can be achieved through a suitable manual clamping device. As shown in FIG. 6, such a device includes clamp halves 96 and 97.

The latter are contoured to slidably engage bar 17, and when locked in position by lever 98, firmly engage the bar. The respective clamp members are thus pivotally joined at pin 99. Pin 101 likewise pivotally connects lever 98 such that the latter can be swung to the forward or locking position hooked to protruding pin 102.

With the desired guide shaft spacing arrived at, the respective end clamping means are firmly engaged with the transverse bar 17 either by tightening bolts 62 and 63, or by moving clamp lever 98 to the forward, locking position.

With shafts 12 and 13 thus firmly set, the "U" connection of clamp member 38 is slid along the shaft in a manner that the telescopic joint at 39 and 42 permits relative movement between said clamp member and the forked element 39. After accurately aligning the two wheels 26 one with the other, the telescopic joint is fastened thereby to substantially rigidize the relationship between each wheel 26 and the chassis 11.

Similarly, driver's seat 71 can be positioned along the bar 17 by loosening of the seat clamping device 81 and 82. Said positioning is contingent on the disposition of the driver, i.e. whether the seat should properly be moved centrally of chassis 11 or moved to one side or the other as the particular conditions of the race might warrant.

Other modifications and variations of the invention as hereinbefore set forth can be made without departing from the spirit and scope thereof, and therefore, only such limitations should be imposed as are indicated in the appended claims.

I claim:

1. An animal drawn sulky having spaced apart, adjacent guide shafts, each of which includes an inner and remote end, and having harness means thereon for attaching to an animal positioned between the respective shafts, at least one elongated transverse bar disposed substantially normal to said respective guide shafts, and having a wheel rotatably carried at each lateral terminus of said transverse bar, said spaced apart guide shafts being selectively fixed at the inner ends thereof to said at least one transverse bar to establish an interspace between the respective shafts in accordance with the width of an animal harnessed therebetween.

2. In an apparatus as defined in claim 1, including a connector member to operably engage said at least one transverse bar and a guide shaft end respectively.

3. In an apparatus as defined in claim 1, wherein the inner end of said respective guide shafts includes a connector member having a clamp means thereon adapted to be longitudinally slidable along, and to be tightened into rigid engagement with said at least one transverse bar.

4. In an apparatus as defined in claim 1, wherein said at least one transverse bar includes a single bar formed with a noncircular cross sectional configuration along a plane which is normal to the bar longitudinal axis.

5. In an apparatus as defined in claim 1, wherein said at least one transverse bar is substantially oval in cross sectional configuration along a plane normal to the bar longitudinal axis.

6. In an apparatus as defined in claim 2, wherein said connector includes a connecting shank to removably engage one of the inner ends to permit disassembly of said guide shaft from the sulky.

7. An animal drawn sulky including a pair of outboard wheels, and spaced apart guide shafts having inner and remote ends, respectively, said guide shafts having harness means thereon for attaching to an animal positioned between said shafts, and an elongated transverse bar disposed substantially normal to said guide shafts, means for adjustably connecting the inner ends of said guide shafts to said transverse bar to establish an interspace between the shafts in accordance with the width of an animal harnessed therebetween, a stabilizing brace depending from each guide shaft and engaging one of said outboard wheels adjacent to said shaft.

8. In an apparatus as defined in claim 7, wherein said stabilizing brace is operably attachable to a guide shaft to permit longitudinal adjustment of said brace relative to said guide shaft.

9. In an apparatus as defined in claim 7, wherein said stabilizing brace includes at least two brace bars, having adjustable connecting means therebetween, each of said brace bars being attached to one of said outboard wheels and to a guide shaft adjacent to the latter, said adjustable connecting means being adapted to regulate the disposition of said wheel with respect to said guide shaft.

10. In an apparatus as defined in claim 9, wherein the respective brace bars are disposed in substantial axial alignment, said connecting means therebetween which is operable to lock the respective bars to fix the relationship therebetween.

11. In an apparatus as defined in claim 2, wherein said universal connector includes a pair of clamping jaws adapted to be adjusted to an open position to allow said universal connector to slidably engage said at least one transverse bar, and a locking lever mutually engaging said respective clamping jaws, being adjustable to firmly lock the respective jaws to said bar.

* * * * *